United States Patent Office 3,434,264
Patented Mar. 25, 1969

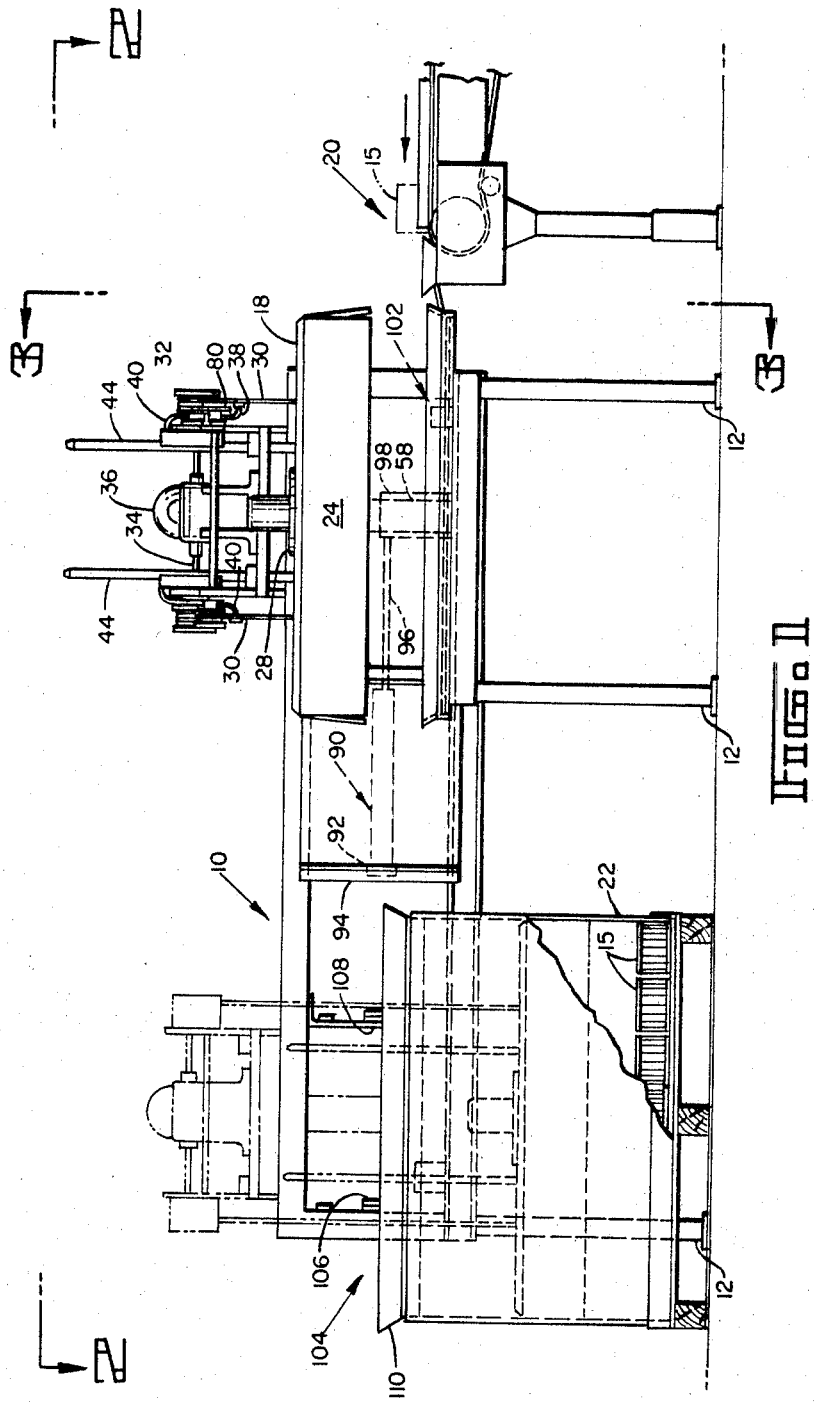

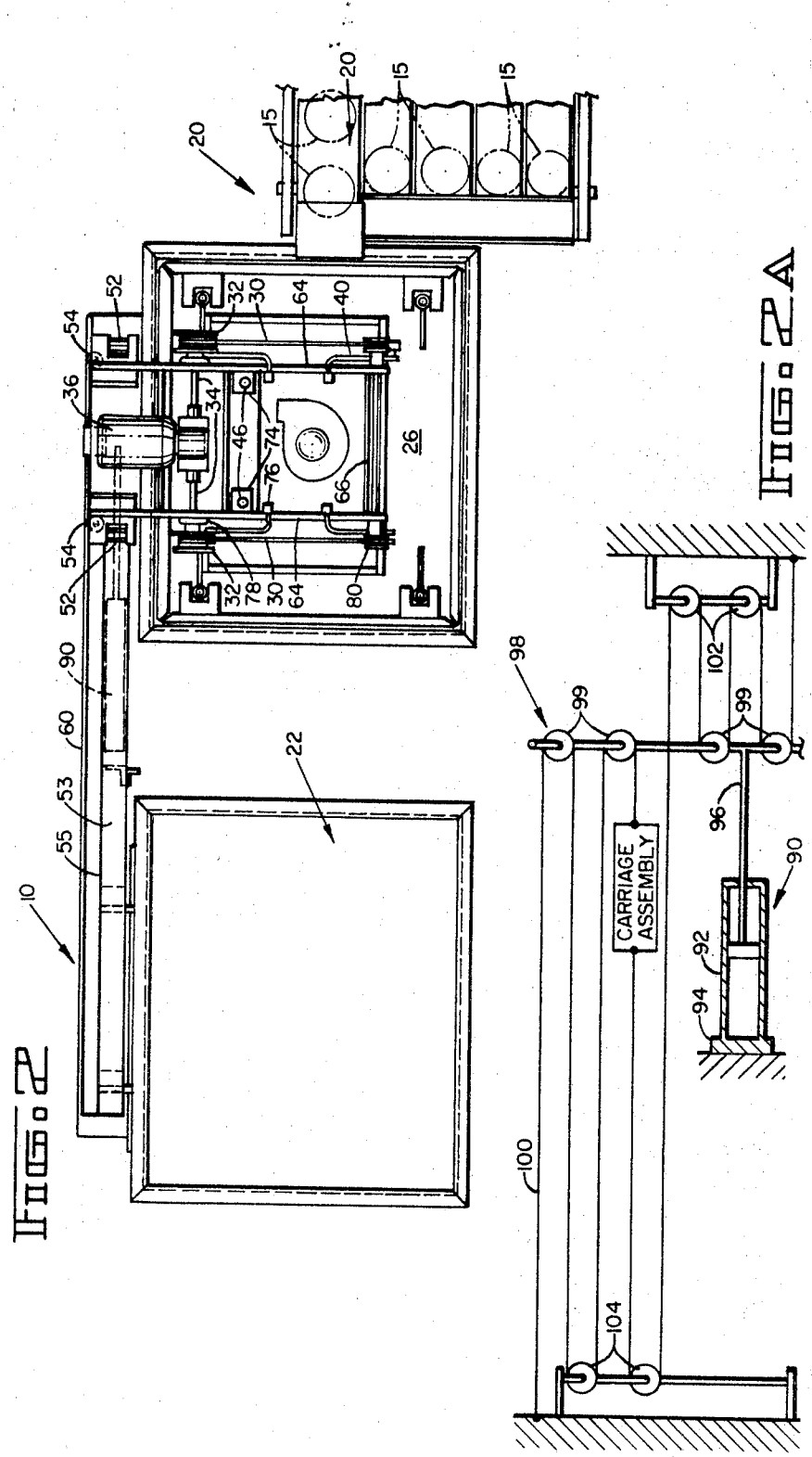

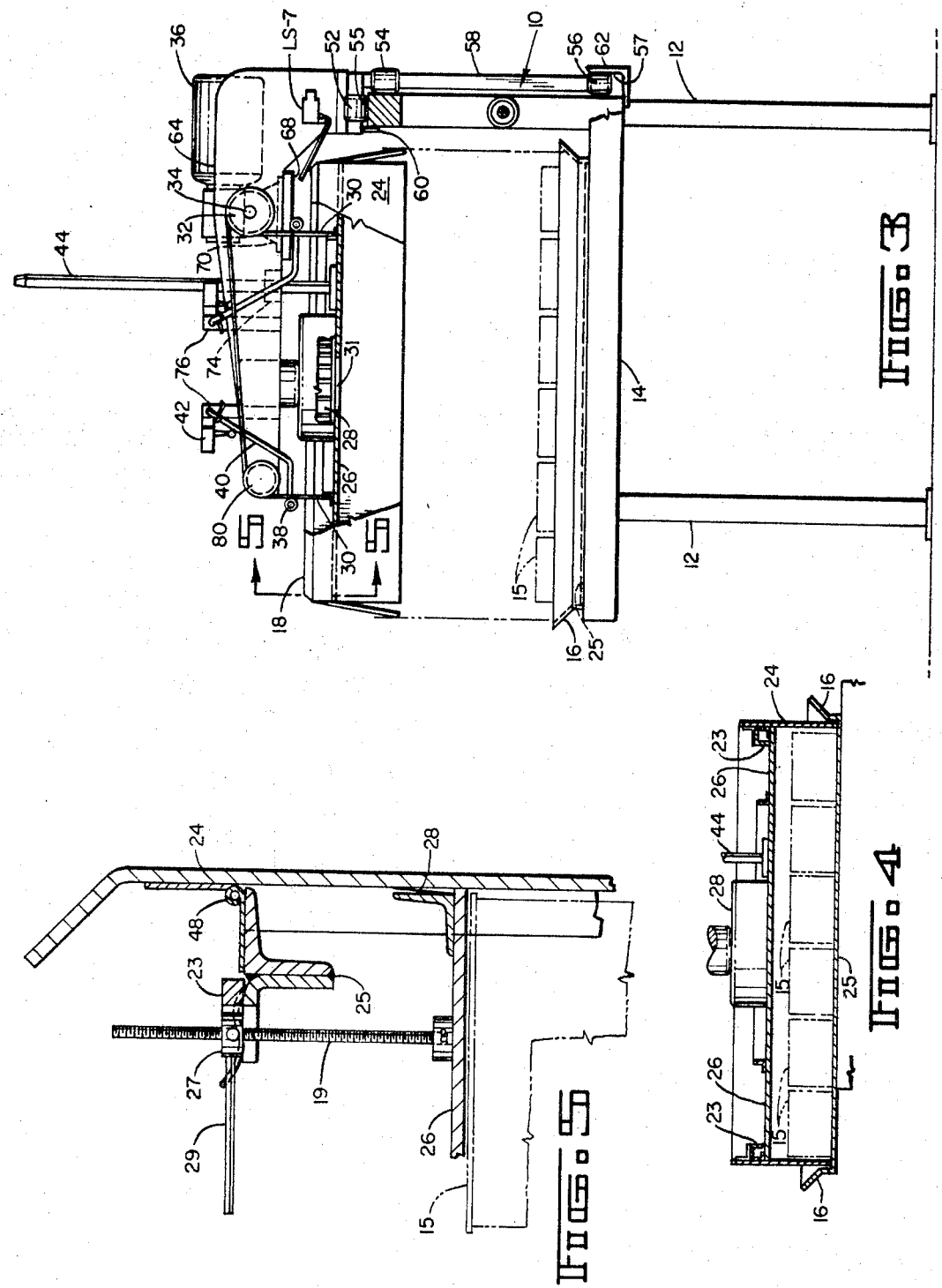

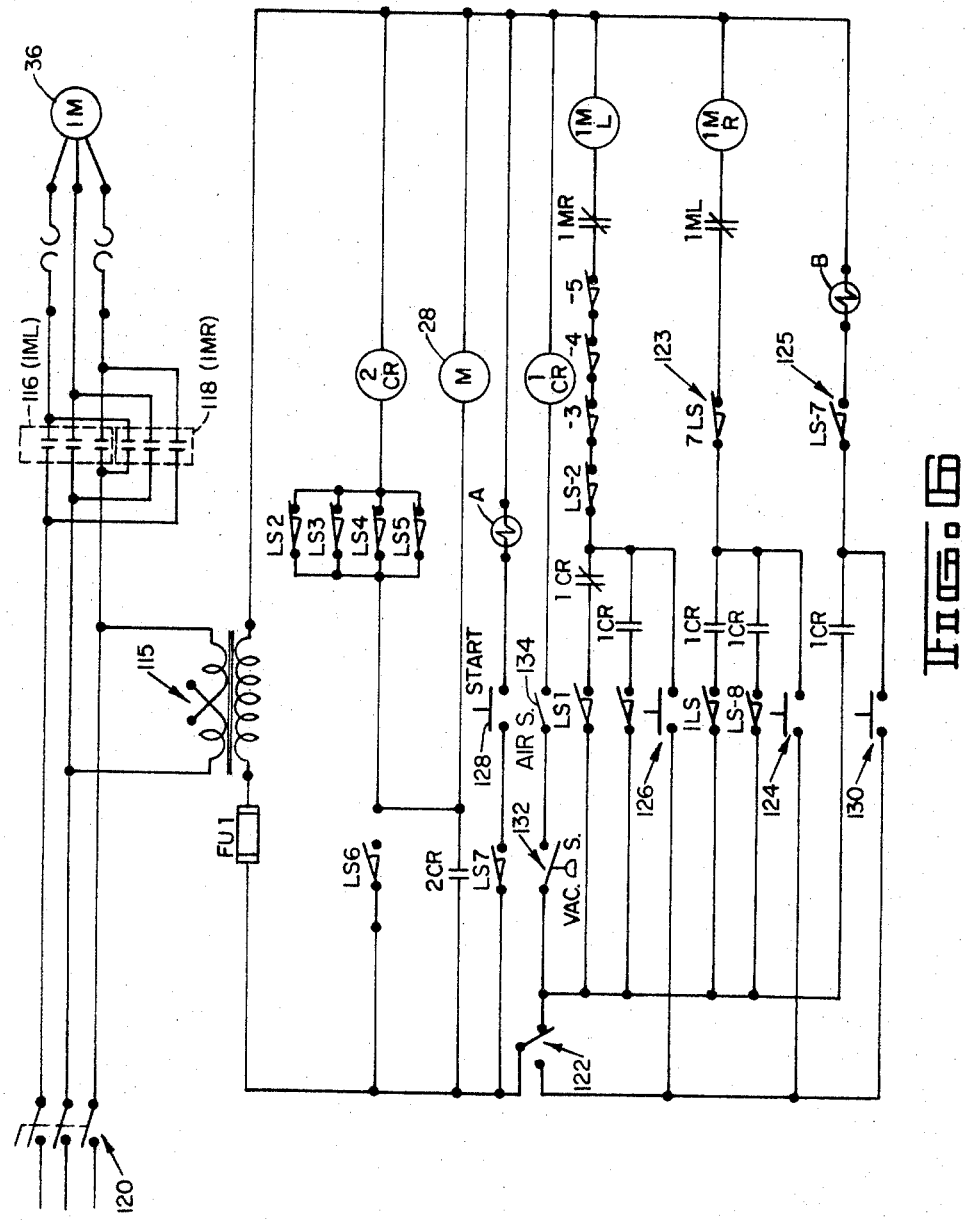

3,434,264
APPARATUS FOR STACKING PALLETIZED
GROUPS OF ARTICLES IN A CONTAINER
Vincent N. Delaney, New Hartford, Conn., assignor to
The Torrington Manufacturing Company, Torrington,
Conn., a corporation of Connecticut
Filed Nov. 17, 1966, Ser. No. 595,074
Int. Cl. B65b *57/00, 35/50;* B65d *19/22*
U.S. Cl. 53—59                                    20 Claims

ABSTRACT OF THE DISCLOSURE

Machines for packing articles in a container, more particularly, an apparatus for vacuum handling groups of articles on a pallet.

A general object of the present invention is to provide an apparatus for lifting a pallet, with the articles thereon, upwardly from a horizontal loading platform.

Another object of the present invention is to provide an apparatus for moving successive pallets, each of which pallets has a group of articles thereon, into a single container so that said successive groups are separated from one another in the container by the pallets.

Another object of the present invention is to provide an apparatus for stacking palletized groups of articles, which apparatus is capable of lifting said articles upwardly from and off a loading platform while said articles are arranged on a generally flat pallet, and which apparatus is also capable of lowering the palletized articles into a container which corresponds in cross sectional size and shape to one of said pallets.

A more specific object of the present invention is to provide an apparatus for stacking palletized groups of articles, which apparatus may be operated either in a manual or an automatic mode to stack successive pallets, with the articles thereon, in an upwardly open container which corresponds in cross sectional size and shape to the peripheral contour of one of said pallets.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 is a side elevational view of an apparatus constructed in accordance with the present invention, showing a conveyor for delivering articles to be stacked onto a loading platform of the apparatus, and also showing a movable portion of the apparatus in full lines above the loading platform at the right-hand side of the apparatus, and in broken lines at the left-hand side thereof.

FIG. 2 is a plan view of the apparatus shown in FIG. 1.

FIG. 2A is a schematic view of a cable and pulley system for moving a portion of the apparatus shown in FIG. 1.

FIG. 3 is an end view of the apparatus shown in FIG. 1.

FIG. 4 is a view of a portion of the apparatus shown in FIG. 3 showing the hood in its lowered position on the loading platform.

FIG. 5 is a detail of one corner of the hood shown in FIG. 4 with a portion of said hood moved downwardly as indicated by the broken lines.

FIG. 6 is a schematic view of the circuitry associated with the apparatus of FIG. 1.

Turning now to the drawings in greater detail, and more particularly to FIGS. 1 and 2 thereof, an apparatus of the present invention is there shown as comprising an elongated framework 10 supported by a plurality of legs 12, 12 and having a loading station at the right-hand end of the framework, and a container station at the left-hand end as shown.

Considering first the construction of the loading station, FIG. 3 shows this station as comprising a horizontally arranged platform 14 supported on four legs 12, 12 and having a funnel-shaped fence 16 extending peripherally around the platform 14. The platform 14 and peripheral fence or funnel 16 are shown as rectangular, but it will be apparent from the description to follow that other shapes might be used since the size and shape of the loading station and its associated funnel are dictated by the cross-sectional size and shape of the container to be filled.

As best shown in FIG. 2, a plurality of circular articles to be stacked 15, 15 are fed onto the loading platform 14 by conventional means, such as the horizontally arranged conveyor belt indicated generally at 20. As will be apparent from the description to follow the actual manner of loading the articles on the loading platform, and the particular shape of the articles being loaded, comprises no part of the present invention these items being shown for purposes of illustration only. FIG. 1 shows all of the articles 15, 15 as having a uniform depth and it should perhaps be noted here that in the embodiment shown the articles comprise blower wheels of the centrifugal type which are to be stacked in a relatively large rectangular container indicated generally at 22 on the left-hand side of FIGS. 1 and 2.

A rectangularly shaped hood structure 18 is centered above the loading platform 14 and suitable means is provided for lowering the hood structure downwardly onto the loading platform and for subsequently raising said hood structure to the position shown. The means for moving the hood structure will be described in greater detail hereinafter.

The hood structure 18 will be seen to be of approximately the same size and shape as the funnel 16 so that it can be lowered therein as shown in FIG. 4. The hood 18 has depending skirt means for enclosing the sides of the space occupied by the articles 15, 15. The skirt means preferably comprises a plurality of skirt panels 24, 24 the lower edges of which contact a cardboard pallet 25 prepositioned on the loading platform as best shown in FIG. 4.

The hood structure 18 also comprises a generally horizontally arranged contact plate 26 which forms the upper boundary of the space occupied by the articles 15, 15. The contact plate 26 is connected to the above-mentioned means for raising and lowering the hood structure and is vertically adjustable with respect to the skirt panels 24, 24 as shown in FIG. 5 so that the underside of the contact plate 26 can engage the upper edges of the articles on the loading platform as indicated by the broken lines in that figure. More particularly, the skirt means is so mounted on the plate 26 as to be adapted for limited vertical adjustment with respect to the contact plate 26. Preferably, and as shown in FIG. 5, a threaded post 19 is provided on the plate 26 adjacent each corner thereof. A quick adjust nut or collar 27 is pivotally carried by the frame 23 so as to threadably receive the post 19 as shown. A lever 29 is biased toward the position shown in FIG. 5 so that the nut 27 threadably engages the post 19. It will be apparent that by pivoting the lever 29 upwardly, the nut 27 can be slid along the post 19 and the plate 26 conveniently positioned adjacent the articles 15, 15 thereby minimizing the air to be evacuated from beneath the hood structure 18.

The contact plate 26 carries a blower housing, indicated generally at 28, and an air blower is provided inside the housing for exhausting air from beneath the hood structure 18 through a central opening 31 provided in the contact plate 26, which opening serves to place the interior of the blower housing in communication with the interior of the hood structure 18 as shown in FIG. 3. The air blower is preferably selected to have performance curve (pressure vs. airflow) such that the maximum pressure developed is not sufficient to damage the cardboard pallet, while the minimum pressure is sufficient to support a loaded pallet in spite of some predetermined leakage flow.

The skirt panels 24, 24 hingedly connected to the rectangular frame 23 so that said panels are all adjustably mounted to the contact plate 26. A flexible seal, indicated generally 28, is provided between the skirt panels 24, 24 and the plate 26 so that upon lowering the hood structure onto the loading platform enough air can be exhausted from above the pallet upon which the articles are arranged to permit the entire hood structure to be raised back to the position shown in FIG. 3 with the pallet 25 held in sealing engagement with the lower edges of the aforementioned skirt panels 24, 24 by virtue of the difference in air pressure across the cardboard pallet 25. A limit switch LS-6 (shown in FIG. 6) is mounted on the loading platform 14 and is closed when the hood structure has been lowered onto the platform 14. By virtue of the relative adjustment between the skirt panels 24, 24 and the contact plate 26, the volume of air required to be exhausted can be minimized for articles of various heights. Each skirt panel 24 is pivotally carried along one side edge of the contact plate 26 for swinging movement about a hinge line 48 which is parallel to the adjacent side edge of the plate 26. The hinge line is preferably spaced above the plate side edge and the aforementioned seal 28 comprises a resilient leaf spring arranged at said plate side edge as shown. As so constructed and arranged, each skirt panel 24 is urged outwardly to the position shown so that said skirt means does not interfere with articles 15, 15 on the loading platform during downward movement of the hood structure 18. Once the lower edges of the downwardly moving skirt panels 24, 24 clear the tops of the articles 15, 15 on the loading platform, the panels are urged inwardly by the funnel-shaped fence 16 which guides the lower panel edges into engagement with the upper surface of the pallet.

It is further to be noted that the skirt panels 24, 24 curve inwardly along their upper marginal side edges. The upward and inward curvature of these upper edges serves to guide the hood structure as it is raised out of the container in a manner to be described hereinbelow.

Turning now to the means for raising and lowering the hood structure 18, FIGS. 2 and 3 show four cables 30, 30 each of which has one end connected to the hood structure 18, and more particularly to the upper side of the contact plate 26 thereof. The cables 30, 30 are wound respectively on a pair of drums 32, 32 rotatably supported in a horizontally movable carriage assembly to be described. Each of the drums 32, 32 is keyed to a shaft 34, which shaft is drivingly connected to an electric hoist motor 36 to permit the hood structure 18 to be raised and lowered in response to appropriate electric signals. Each of the four cables 30, 30 is engaged by an idler pulley 38 carried at the free end of a pivotally mounted lever 40, which lever is spring-biased to absorb cable slack. A plurality of limit switches LS-2, LS-3, LS-4 and LS-5 are mounted on the carriage adjacent each lever so as to be tripped whenever excess slack is developed in any of said cables 30, 30. These limit switches are operable to shut off the hoist motor 36 during lowering of the hood structure in FIG. 6 and also perform another important function to be discussed hereinbelow in connection with the operation of the blower 28. A limit switch LS-7 mounted on the carriage assembly, is operable to shut off the hoist motor when the hood reaches its upper limit of travel.

Two vertically arranged guide posts 44, 44 are mounted on the contact plate 26 and ride in corresponding guide openings 46, 46 defined in the carriage assembly so that the hood structure moves vertically only with respect to the carriage assembly. The guide posts 44, 44 in conjunction with the peripherally extending funnel-shaped fence assure that the lower edges of the skirt panels 24, 24 engage the upper surface of the cardboard pallet 25.

In further accordance with the present invention, suitable means is provided for moving the above-described hood structure horizontally between a first position over the loading platform 14 just described, and a second position at the left-hand side of the apparatus over the container to be filled which container is prepositioned as shown in FIGS. 1 and 2. Said means for moving the hood horizontally preferably comprises a track defined on said elongated framework 10 and the carriage assembly mentioned hereinabove. A fluid motor is also provided and acts between the framework 10 and the carriage assembly for moving the latter from said first position over the platform to said second position over the container to be filled.

As shown in FIG. 3, the carriage assembly is slidably received on the fixed frame 10 by a plurality of rollers indicated generally at 52, 54 and 56. Each of the rollers 52, 54 and 56 is rotatably supported in the carriage assembly on a depending portion 58 thereof so that the rollers 52, 52 engage an upwardly facing track surface 53, the rollers 54, 54 a rearwardly facing track surface 55, and the roller 56 a forwardly facing track surface 57, all of which track surfaces are defined in the fixed frame 10. The weight of the carriage assembly creates a counterclockwise moment (FIG. 3) such that all of the rollers 52, 52 and 56 are held in contact with their respective track surfaces. A depending pin 60 on the carriage portion 58 serves to guide the rollers 54, 54 so that they are held in engagement with the rearwardly facing fixed track surface 55 while an angle bracket 62 defines the forwardly facing fixed track surface 57. The depending T-shaped portion 58 of the carriage assembly is thus slidably supported on the frame 10 for movement along a horizontal line from said first position to said second position.

A forwardly extending portion of the carriage assembly is attached to the upper end of the member 58, and as shown in FIG. 2 said forwardly extending portion comprises two spaced apart end plates 64, 64 which are held in place by a first cross member 66 adjacent the forward ends of the end plates 64, 64 and a second horizontally arranged cross member 68 which supports the hoist member 36 and its associated gear reduction means as shown in FIG. 3. The guide post openings 46, 46 mentioned hereinabove with respect to the guide posts 44, 44 are defined in inwardly protruding lands from the end plates 64, 64, respectively. The pivotally mounted levers 40, 40 mentioned hereinabove with respect to the hoist cables are pivotally supported in upstanding posts 76, 76 as shown. The drive shafts 34, 34 which carry the drums 32, 32 for the hoist cables 30, 30 are rotatably received in suitable journals defined for this purpose in the end plates 64, 64, respectively. As mentioned hereinabove, four hoist cables 30, 30 are provided according to the present embodiment, and the rearmost pair of hoist cables are directly received on the drums 32, 32 as best shown in FIG. 3, while the forward pair of such cables pass over a pair of pulleys 80, 80, respectively. The pulleys 80, 80 are rotatably received in suitable journals provided adjacent the forward ends of the end plates 64, 64, respectively.

Finally, and still with reference to the means for moving the carriage assembly horizontally along the frame 10, a fluid motor 90 is provided for this purpose and will be seen to have a fixed portion 92 attached to a vertical strut 94 best shown in FIG. 1. The fluid motor 90 has a reciprocating portion 96 which carries a movable block 98 upon which is rotatably supported a set of four pulleys 99, 99 best shown in FIG. 2A. A cable 100 is entrained on these movably mounted pulleys and on fixed pulleys 102 and 104 located adjacent the right and left-hand ends respectively of the frame 10 so as to cause a linear cable movement significantly greater than the longitudinal stroke of the fluid motor 90. For example, with the arrangement shown, a relatively short stroke fluid or air motor can be used to achieve linear movement of the cable in the ratio of one to four. The cable 100 is connected to the carriage assembly as mentioned and limit switches LS–1 and LS–8 (FIG. 6) are closed upon movement of the carriage to its extreme right and left-hand positions respectively. The operation of the air motor is controlled by solenoid valves A and B (FIG. 6) which are energized by the closing of limit switch LS–7, and by contacts 1CR to be described.

An electrical circuit for sequencing operation of the above-described blower motor, hoist motor, and air cylinder, is provided so that once a pallet containing a group of articles to be packed has been raised at the loading station as described hereinabove, the air cylinder 90 causes the carriage assembly to move from the loading station at the right-hand end of the apparatus to a container station at its left-hand. The container station will now be described prior to discussing the control circuit shown in FIG. 6.

The container station basically comprises means for supporting an upwardly open container 22, which may be of conventional cardboard construction, and a container associated funnel means 110 is pivotally supported from the frame of the machine as best shown at 106 and 108 in FIG. 1. The funnel means 110 assures proper positioning of the container 22 with respect to the frame 10 and also serves to guide the hood structure during downward movement thereof into the container as shown by the broken lines in FIG. 1. The carriage assembly will always move through a predetermined horizontal displacement and it will be apparent that the container 22 must be rather precisely located on the frame 10, since the pallet 25 corresponds in its peripheral contour and shape to the inside of the container. The means for supporting the container 22 preferably comprises a wood pallet of the type which is commonly used by a conventional fork lift truck. The wood pallet 112 may be placed on the floor adjacent the machine frame 10 and the container 22 manually located thereon so that the funnel means 110 can be subsequently lowered into the container in order to accurately locate it on the frame 10. The funnel means 110 flares outwardly and upwardly in the same manner as the peripheral fence or funnel 16 described hereinabove with respect to the loading station.

Turning now to the electrical control circuitry in greater detail, FIG. 6 shows the hoist motor 36 connected to a source of three phase electrical power through a plurality of relay contacts 116 and 118 to be described. Single phase AC power is drawn from the motor lead lines and the resulting voltage may be further reduced as shown at 115 to povide electric power for a control relay 1CR, a blower motor relay 2CR, and hoist motor control relays 1MR and 1ML. An on-off switch for the overall circuit is shown at 120 while a manual-automatic selector switch is shown at 122 to permit manual or automatic operation of the hoist motor 36 with push button switches indicated generally at 124 and 126.

A push button "start" switch 128 is provided to energize solenoid A, which solenoid opens a valve admitting air under pressure to one side of the air motor 90 so that the carriage assembly is driven toward the loading station. The carriage is normally stored at the container station and a reset push-button type switch 130 is provided in the manual circuit to permit manual energizing of solenoid B in order to manually return the carriage to the container station.

As mentioned the automatic cycle of operation is initiated by closing switch 128. Solenoid A is thereby energized and the carriage driven to the loading station if the hood is in its elevated position as shown in FIG. 3, limit switch LS–7 being held closed as a result of such elevated position of the hood structure.

When the carriage reaches the loading station limit switch LS–1 will close causing hoist motor relay 1ML to be energized. A normally closed set of contacts in control relay 1CR as well as a normally closed set of contacts in hoist motor relay 1MR permit current to reach the relay 1ML through limit switches LS–2, 3, 4 and 5, each of which is closed when the weight of the hood structure is supported by the cables 30, 30.

Energizing down relay 1ML causes its normally open contacts 116 to close sending electrical energy to the hoist motor to drive it in the proper direction for lowering the hood structure 18. The hoist motor relays 1ML and 1MR are of the so-called "plugging" type which accept successive up and down control signals without ill effect on the hoist motor.

The downwardly moving hood structure 18 will engage the cardboard pallet 25, as well as the articles thereon as described hereinabove, and when any one of the cable slack detecting limit switches LS–2, LS–3, LS–4 or LS–5 open the hoist motor down relay will be de-energized shutting off the hoist motor 36. Limit switch LS–6 on the loading platform will be closed when the hood structure has reached its full down position energizing blower control relay 2CR and causing its contacts 2CR to close starting the blower motor 28.

When the blower motor has reduced the air pressure within the hood structure by a predetermined amount, a vacuum switch 132 is closed energizing control relay 1CR. Since limit switch LS–1 is closed when the carriage assembly is at the loading station, and since limit switch LS–7 is normally closed as shown, contacts 1CR control the hoist motor up relay 1MR to send power to the hoist motor 36 to drive it in the proper direction for raising the hood. Normally closed contacts 1ML, and 1MR in the hoist motor relays 1MR and 1ML respetcively are provided solely to assure that the hoist motor does not receive electrical energy through both hoist motor relays at the same time. Normally closed contacts 123 of limit switch LS–7 open when the hood structure reaches its upper limit of travel de-energizing relay 1MR.

Limit switch LS–7 also includes normally open contacts 125 which are closed upon raising of the hood, causing solenoid B to be energized whenever the hood is raised, and contacts 1CR are closed. Thus, the carriage is driven toward the container station as soon as the hood is raised since contacts 1CR will have been previously closed upon creation of the predetermined vacuum within the hood structure.

The left-hand limit switch LS–8 will be closed when the carriage reaches the container station, causing hoist down relay 1ML to be energized. Contacts 1CR of the main control relay will have been previously closed as a result of the vacuum created in the hood structure, slack detection limit switches LS–2, LS–3, LS–4, and LS–5, also in this circuit will be closed because of the tensioned cables 30, 30. In the container position the hoist motor 36 will lower the hood structure 18, together with the pallet 25 which is held thereto by the difference in pressure created thereacross, until one of the slack detection limit switches LS–2, LS–3, LS–4 or LS–5 is opened.

The blower motor 28 will remain on until contacts 2CR open as a result of de-energizing blower control relay 2CR. It will be apparent that each of the four cable slack limit switches LS–2, 3, 4 and 5 must be opened in order to de-energize relay 2CR. These limit switches are arranged in parallel for this purpose in order to avoid dropping the pallet with its associated articles into the container in the event that the pallet becomes skewed for any reason.

Once the blower motor 28 is shut off, the vacuum in the hood structure will soon be lost, opening the vacuum switch 132 de-energizing relay 1CR, and causing its associated contacts 1CR to return to the normal closed position. An air switch 134 is series connected to the vacuum switch 132 as shown, and is responsive to air flow a a reult of blower operation so that the relay 1CR is only energized when the blower is exhausting air from the hood structure. The air switch 134 assures that the relay 1CR is not reenergized during raising of the hood inside the container 22. It has been found that a piston effect is sometimes encountered during this portion of the machine cycle which could cause the vacuum switch 132 to close when the hood structure is being withdrawn from the container. The air switch 134 renders the vacuum switch ineffective in controlling the relay 1CR during this portion of the machine cycle. The hoist motor up relay 1MR will then be energized since left-hand limit switch LS-8 will be closed at this point. When the hood structure 18 reaches its upper limit of travel normally closed contacts 123 of limit switch LS-7 on the carriage will open de-energizing the hoist relay 1MR and shutting off the hoist motor.

The foregoing describes in some detail one complete cycle of operation of the above-described device. It will be apparent that a second cycle can be initiated by simply depressing the manual switch 128 in the manner described above.

The manual mode of operation of the above-described device is readily apparent from the wiring schematic shown in FIG. 6. For example, the apparatus would be started in the same manner as discussed above with respect to the automatic mode of operation, but instead of the hoist motor being automatically lowered toward the loading platform as described above, a manual pushbutton type switch 126 would have to be depressed. Further, the hoist motor would have to be manually raised by depressing the pushbutton type switch 124, and it should perhaps be noted that the blower motor would not have to be manually energized for operation of the blower in the manual mode. Finally, a reset pushbutton type switch 130 is provided in order to cause the carriage to traverse from the loading station to the container station. Lowering of the hood structure into the container could be accomplished with the same pushbutton switches 124 and 126 mentioned hereinabove.

The invention claimed is:

1. Apparatus for stacking palletized groups of articles in an upwardly open container, said apparatus comprising a generally horizontal loading platform on which a pallet can be placed to receive a predetermined number of such articles, a hood shaped to fit over palletized articles on said platform and having lower edges for engaging a pallet thereon, means for moving said hood toward and away from said platform, means for exhausting a portion of the air under said hood after said hood has been moved onto said platform so that when said hood is subsequently moved away from said platform the pallet is held against the lower edges by the difference in air pressure created across said pallet.

2. Apparatus for stacking palletized groups of articles in a container as set forth in claim 1 wherein said hood includes a generally horizontal contact plate which is approximately coextensive in size with the pallet on said platform and adapted to contact the tops of the articles on said pallet when said hood is lowered onto said platform, said hood further including skirt means depending peripherally from said plate, and said skirt means being adjustably supported on said plate so that said hood can accommodate articles of various heights.

3. Apparatus for stacking palletized groups of articles in a container as set forth in claim 2 wherein said hood includes a seal between said skirt means and the peripheral edge of said contact plate.

4. Apparatus for stacking palletized groups of articles in a container as set forth in claim 2 wherein said air exhausting means comprises an exhaust blower having a housing attached to the upper surface of said contact plate, the interior of said blower housing communicating with the space below said plate through an opening defined in said plate.

5. Apparatus for stacking palletized groups of articles in a container as set forth in claim 3 wherein said seal comprises a resilient leaf spring so arranged as to urge said skirt means outwardly so that the lower edges thereof clear the articles on said platform during downward hood movement, said funnel serving to urge said skirt means inwardly prior to engagement with said pallet.

6. Apparatus for stacking palletized groups of articles in a container as set forth in claim 2 and further characterized by means for moving said hood horizontally between a first position over said platform and a second position over a container to be filled, and said means for raising and lowering said hood also serving to lower said hood into the container when a pallet is held thereto, and to raise said hood after said air exhausting means has released the pallet inside the container.

7. Apparatus for stacking palletized groups of articles in a container as set forth in claim 6 wherein said means for moving said hood horizontally comprises a track attached at one end to said platform and having an opposite end adjacent the container to be filled, a carriage mounted on said track, and a motor for selectively traversing said carriage in either direction along said track.

8. Apparatus for stacking palletized groups of articles in a container as set forth in claim 7 and further characterized by an upwardly and outwardly flared funnel attached to said opposite end of said track, said funnel being so shaped as to guide said hood during downward movement thereof from said second position into said container.

9. Apparatus for stacking palletized groups of articles in a container as set forth in claim 7 wherein said means for raising and lowering said hood includes a hoist motor mounted on said carriage, at least one drum rotatably mounted on said carriage in driven relationship with said hoist motor, and at least one cable connected at one end to said drum and at its other end to said hood contact plate, and said apparatus being further characterized by an electrical control circuit for operating said hoist motor in timed relation with said air exhausting means so that with said carriage in its first position, said hood is lowered onto said loading platform wherein said air exhausting means can be activated and said hood subsequently raised with a pallet neld thereto back to said first position, and an electrical control circuit for operating said carriage traversing motor in timed relation with said hoist motor so that when said hood is raised with a pallet held thereto, said carriage moves toward said second position, said first mentioned hoist motor control circuit including switching means operable to lower said hood and pallet into said container at said second carriage position wherein said pallet can be released by deactivating said air exhausting means.

10. Apparatus for stacking palletized groups of articles in a container as set forth in claim 9 wherein said switching means in said hoist motor control circuit includes a pressure sensitive switching device responsive to a predetermined vacuum pressure in said hood, and said pressure sensitive switching device also comprises a part of said carriage motor traversing circuit whereby said carriage is automatically driven to said first position when said pressure sensitive switch does not detect said predetermined vacuum pressure in said hood.

11. Apparatus for stacking palletized groups of articles in a container as set forth in claim 9 wherein said air exhausting means comprises an exhaust blower having a housing attached to the upper surface of said contact plate, the interior of said blower housing communicating with the space below said plate through an opening defined in said plate, and a blower control relay for activating and deactivating said blower, at least four cables connected to laterally spaced points on said hood, and a limit switch associated with each of said cables, a platform associated limit switch operable to energize said blower control relay when said hood is lowered onto said platform, said blower control relay being deenergized only when each of said cable associated limit switches are opened to assure that said pallet is completely lowered into said container prior to deactivating said air exhausting means.

12. Apparatus for stacking palletized groups of articles in a container as set forth in claim 9 wherein said hoist motor control circuit further includes manually operated switches for manually raising and lowering said hood, and a plugging relay for preventing damage to said hoist motor during manual operation.

13. Apparatus for stacking palletized groups of articles in a container as set forth in claim 9 wherein said carriage traversing motor comprises a fluid motor, and wherein said traversing motor control circuit includes solenoid valves for driving said fluid motor toward said first and second positions respectively.

14. Apparatus for stacking palletized groups of articles in a container as set forth in claim 9 and wherein said switching means of said hoist motor control circuit further includes limit switches at said first and said second carriage positions, and wherein said air exhausting means comprises an exhaust blower having a housing attached to the upper surface of said contact plate, the interior of said blower housing communicating with the space below said plate through an opening defined in said plate, and a blower control relay for activating and deactivating said blower, at least four cables connected to laterally spaced points on said hood, and a limit switch associated with each of said cables, any one of said four cables associated limit switches serving to stop said hoist motor during upward movement of said hood.

15. Apparatus for stacking palletized groups of articles in a container as set forth in claim 9 wherein said carriage traversing motor control circuit includes two manually operated switches for manually moving said carriage towad said first and second positions respectively.

16. Apparatus for stacking palletized groups of articles in a container as set forth in claim 15 wherein said hoist motor control circuit further includes manually operated switches for raising and lowering said hood, and a selector switch for selecting manual or automatic modes of operation of said carriage motor and said hoist motor.

17. Apparatus for stacking palletized groups of articles in a container as set forth in claim 11 and further characterized by vertically arranged guide means connecting said hood with said carriage so as to restrict said hood to vertical movement only with respect to said carriage.

18. Apparatus for stacking palletized groups of articles in a container as set forth in claim 11 and further characterized by means for accumulating slack in any of said cables, said cable associated limit switches being operatively associated with said slack accumulating means so as to be opened whenever excess slack is developed in any one of said cables.

19. Apparatus for stacking palletized groups of articles in an upwardly open container, said apparatus comprising a generally horizontal loading platform on which a pallet can be placed to receive a predetermined number of such articles, a hood shaped to fit over palletized articles on said platform and having lower edges for engaging a pallet thereon, means for moving said hood toward and away from said platform, means for exhausting a portion of the air under said hood after said hood has been lowered into engagement with said pallet, means for moving said hood horizontally between a first position over said platform and a second position over a container to be filled, and control means for operating said last-mentioned means in timed relationship with said hood lowering means, said control means including a pressure sensitive device responsive to a predetermined vacuum pressure in said hood for controlling the lowering of said hood at said first station and the raising of said hood at said second station when said vacuum pressure reaches a predetermined value and the raising of said hood at said first station and the lowering of said hood at said second station when said vacuum pressure does not reach such value, said pressure sensitive device also controlling the horizontal movement of said hood so that with a pallet carried thereon said hood moves toward said second position.

20. Apparatus for stacking palletized groups of articles in an upwardly open container, said apparatus comprising a generally horizontal loading platform, a cardboard pallet adapted for placement upon said platform, a hood structure shaped to fit over a group of articles on said pallet and to engage the upper surface of said pallet, means for moving said hood structure toward and away from said platform, and means for exhausting air from beneath said hood structure, said last-mentioned means being effective to maintain a design pressure differential range across said pallet which is not adversely affected by variations in the air flow requirements occasioned by leakage, said pressure differential having a maximum value insufficient to collapse the cardboard pallet and a minimum value sufficient to lift said pallet with said articles thereon in spite of such leakage.

References Cited

UNITED STATES PATENTS

| | | | |
|---|---|---|---|
| 2,549,004 | 4/1951 | Pomeroy | 53—164 X |
| 2,946,164 | 7/1960 | Potts. | |
| 2,963,836 | 12/1960 | Bruce. | |
| 2,993,315 | 7/1961 | Verrinder. | |
| 3,067,559 | 12/1962 | Lawrence. | |
| 3,099,906 | 8/1963 | McCabe | 53—59 |

WILLIAM A. MORSE, JR., *Primary Examiner.*

U.S. Cl. X.R.

53—164, 257, 260